United States Patent [19]

Tobin, Jr.

[11] 4,287,706

[45] Sep. 8, 1981

[54] GANG MOWER ASSEMBLY

[76] Inventor: Leo W. Tobin, Jr., Morehouse La., Darien, Conn. 06820

[21] Appl. No.: 118,279

[22] Filed: Feb. 4, 1980

[51] Int. Cl.³ ............................................. A01D 75/30
[52] U.S. Cl. ........................................................ 56/7
[58] Field of Search .................... 56/6, 7, 13.6, 13.7

[56] References Cited

U.S. PATENT DOCUMENTS

| 488,669 | 12/1892 | Dake et al. | 56/7 |
| 1,293,287 | 2/1919 | Worthington | 56/7 |
| 1,725,375 | 8/1929 | Seeley | 56/7 |
| 1,995,785 | 3/1935 | Thomas | 56/7 |
| 2,139,200 | 12/1938 | Moyer | 56/7 |

Primary Examiner—Jay N. Eskovitz

Attorney, Agent, or Firm—Sprung, Felfe, Horn, Lynch & Kramer

[57] ABSTRACT

A gang mower assembly for the pulling of push-type reel mowers includes a leading mower mount connectable to a pulling vehicle for movement both laterally and perpendicularly with respect to the pulling direction and two trailing mower mounts each connectable to the leading mower mount for both lateral and perpendicular movement with respect to the pulling direction. Each mower mount is connectable to a push-type reel mower between the reel axis and the ground roller axis and below the wheel axis thereof for exerting a downwardly slanted force in the pulling direction in response to the application of the pulling force.

4 Claims, 6 Drawing Figures

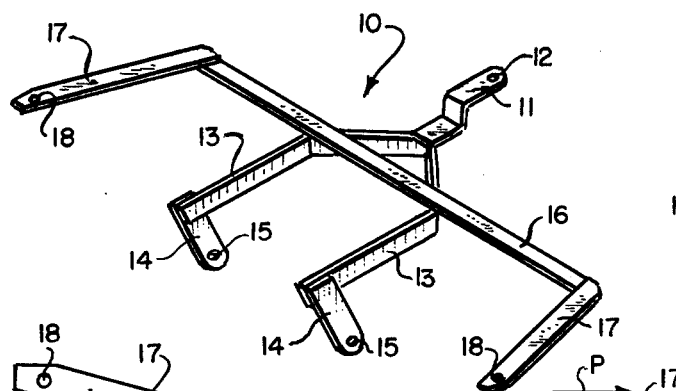
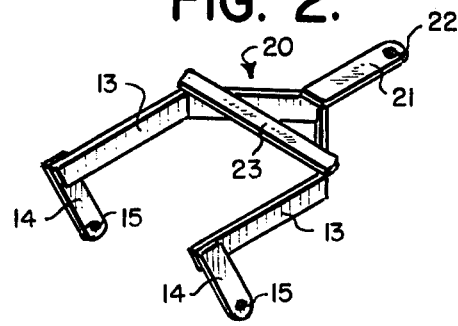
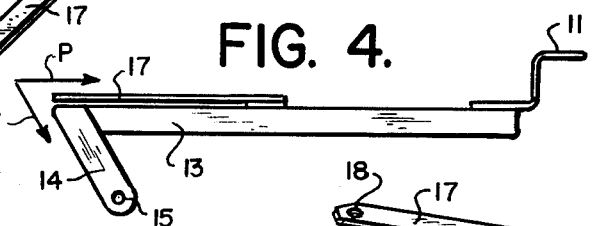
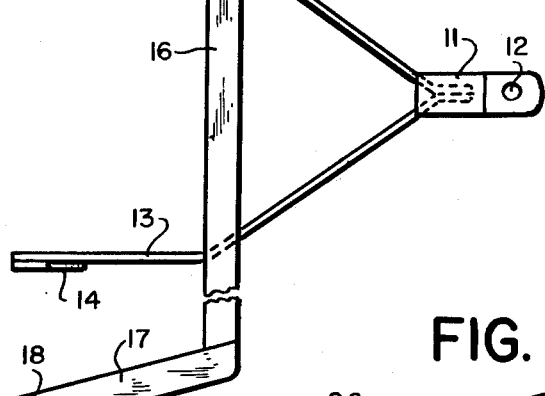
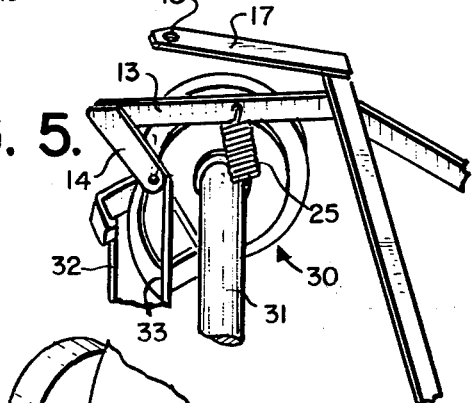
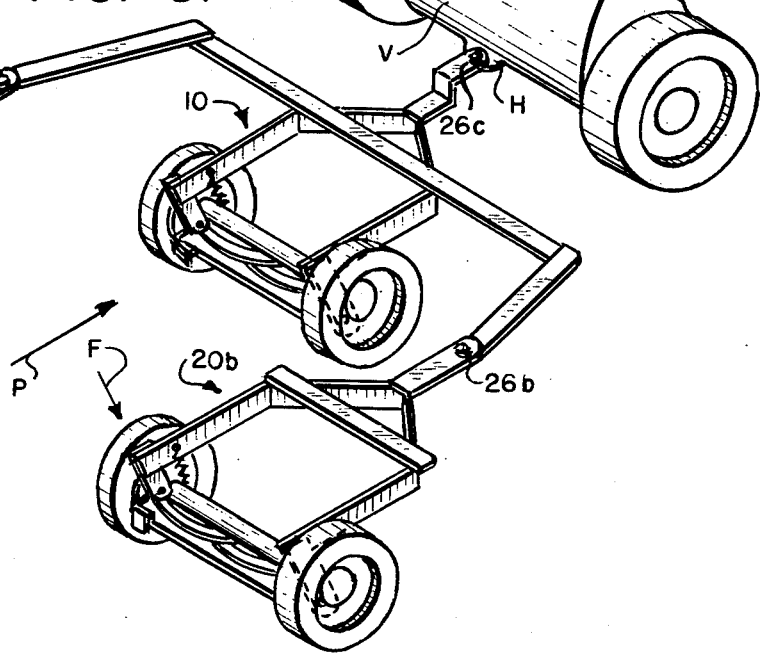

GANG MOWER ASSEMBLY

BACKGROUND OF THE INVENTION

The present invention relates to a gang mower assembly for the pulling of push-type reel mowers by a vehicle exerting a pulling force in a pulling direction.

Push-type reel mowers are known and generally have a pushing handle attached thereto by lugs to mounting holes between the axis of the wheel thereof and the ground roller thereof. The push-type reel mowers are operated by exerting a downward force at an acute angle from the normal in the pushing direction along the pushing handle.

Ganging assemblies for mounting a plurality of hand mowers are known in the prior art as evidenced by U.S. Pat. Nos. 488,669, 1,561,569, 1,995,785, 2,100,910, 2,111,016 and 2,796,719, but these devices have the disadvantage of being relatively complicated structures which do not enable the free movement of the individual mowers with respect to the other mounted mowers within the available degrees of freedom.

SUMMARY OF THE INVENTION

The object of the present invention is to eliminate the disadvantages of the prior art gang mower assemblies and to provide a gang mower assembly which has a simple construction and which enables the user to have all the necessary degrees of freedom of movement of the individual mowers during the mowing operation.

This and other objects are obtained by the gang mower assembly of the present invention, which according to the present invention comprises a leading mower mount having first connecting means for connecting same to a pulling vehicle for movement both laterally and perpendicularly with respect to the pulling direction, two trailing mower mounts, each including second connecting means for connecting same to the lead mower mount for movement both laterally and perpendicularly with respect to the pulling direction and independent of the movement of the other mounts and mounting means disposed on each mower mount for mounting a push-type reel mower thereon between the reel axis of the ground roller axis and below the height of the drive wheel axis to exert a generally downward slanted force in the pulling direction in response to the application of a pulling force by a pulling vehicle.

The gang assembly of the present invention duplicates the forces generated by the handle of a manual push-type reel mower in that a downward and forward slanted force is exerted during use. This is unlike conventional pull-type mowers for gang mower assemblies which are generally designed to be pulled and thus the assemblies are constructed to exert different types of forces on the mower unit.

As a result of the means mentioned above and described hereinafter, the individual mower mounts are capable of being ganged and are free to move independently laterally, vertically and rotationally about the direction of the pulling force.

In accordance with the present invention the hitch framework is designed to apply the pulling force to the mower mechanism from behind with the force being applied to the mower handle lugs and with the lugs being located between the axis of the reel and the axis of the ground roller and below the height of the drive wheel axis. In this manner, a component of the pulling force from the vehicle is diverted downward and combined with a similar downward force resulting from the weight of the mount itself in such a manner as to generate a counter torque to that tending to tip the mower forward to lift the roller from the ground. This force has been found to be sufficient to maintain contact of the rollers with the ground at tractor speeds in excess of a very fast walk.

Also in accordance with the present invention, with this mount configuration the additionl contra-rotating torque may be generated either by adding weight to the hitch assembly or by adding a compression spring between the front of the mower mechanism and the mount in such a manner that the spring tends to lift the drive wheels off the ground which increases the weight of the roller by its effectively carrying the mower.

Further, the gang mounts are articulated by virtue of the fact that the leading mount, which attaches to the vehicle, tows each of the trailing mounts from a single point on its integrated tow bar. Each mower mount is therefore free to move in all degrees of freedom dictated by the terrain. The two trailing mower mounts are arranged to overlap the cut of the lead mower to get the most effective utilization.

Moreover, the means for connecting the mower units to the mounts enables rotation thereof around the lug axis and thus around the direction of the pulling force. The means connecting the mounts to each other allows for lateral and vertical independent movement by the simple means of oversized holes and shoulder bolts at the connections.

Objects, features and advantages of the invention will appear in the description of the drawings wherein:

BRIEF DESCRIPTION OF THE DRAWINGS

FIG. 1 is a plan view of the leading mower mount according to the present invention;

FIG. 2 is a plan view of a trailing mower mount according to the present invention;

FIG. 3 is a top view of the leading mower mount of FIG. 1;

FIG. 4 is a side view of the leading mower mount of FIG. 1;

FIG. 5 is a partial plan view of a mower unit connected to the lead mower mount according to the present invention; and FIG. 6 is a plan view of the entire gang mower assembly being pulled by a vehicle according to the present invention.

DETAILED DESCRIPTION OF THE INVENTION

Referring now to FIGS. 1-6, where like numerals signify like elements, the gang mower assembly according to the portrayed embodiment includes one leading mower mount 10 and two trailing mower mounts 20 preferably composed of a metal such as iron or steel.

The leading mower mount 10 includes a hitch member 11 which is preferably integrally formed having an aperture 12 therein for attaching to the hitch of a pulling vehicle. Connected to the hitch member 11 is a yoke 13 formed in the embodiment shown by two members which are joined by welding at the yoke member 11.

Connected to the top of the members 13, preferably by welding, is the first connecting means including a tow bar having a transverse bar 16 and arms 17 having holes 18 therein for connecting to the trailing mower mounts 20.

Also attached to the yoke members 13, are means for mounting the mower units 30 thereto. The means comprises downward and forwardly slanting bars 14 having mounting holes 15 therein for mounting at the lugs of the mower units between the reel axis 33 and the roller axis 32 and below the drive wheel axis 31 of the mower unit 30 as is shown in detail in FIG. 5. The mower unit 30 is mounted at the lug holes thereof to holes 15 via conventional screw and nut arrangements and enabled to rotate about the axis defined by the line connecting holes 15.

In a preferred embodiment, a compress spring 25 is moreover connected between a point eccentric to the wheel axis 31 and the yoke member 13 directly thereabove in order to provide a counter-torque force. The spring 25 acts to maintain the mower unit on the ground during the pulling thereof by vehicle V. FIG. 4 shows the force F applied by the mower mount 10 in response to the pulling force P by vehicle V.

The trailing mower mounts 20 are identical to the leading mower mount with the exception of the connecting means. In this case, transverse bar 23 is utilized merely as a structural member and a means connecting the trailing mower mounts to the leading mower mount further includes connecting member 21 having oversized holes 22 therein for connecting to the holes 18 of the leading mower mount 10.

As shown in FIG. 6, two trailing mower mounts 20a, 20b are connected to a leading mower mount 10 with shoulder bolts 26a and 26b through connecting holes 18 and 22 so as to provide the freedom of movement for the trailing mower mounts independently of each other and independently of the leading mower mount 10. Shoulder bolt 26c is also provided through the oversized hole 12 and through the hole provided in the hitch H of vehicle V so as to provide the independent degrees of freedom for the leading mower mount 10 as well.

It will be understood by those skilled in the art that the mower unit 30 can be mounted at the lug holes thereof to holes 15 of the mower mounts by other arrangements, including a preferred arrangement wherein studs with holes therein for cotter pins are used to maintain the studs in place. The mount is sprung to allow the mount to pass over the studs and then held in place by the force of the springing of the mount to its normal position and by the cotter pins inserted in the holes.

Moreover, it is clear that the gang mower assembly can be easily modified to include the trailing of 3, 5, 7 or more mower mounts without departing from the scope of the present invention.

It will be appreciated that the instant specification and examples are set forth by way of illustration and not limitation, and that various modifications and changes may be made without departing from the spirit and scope of the present invention.

What is claimed is:

1. A gang mower assembly for the pulling of push-type reel mowers having a wheel axis, a reel axis and a ground roller axis by a vehicle exerting a pulling force in a pulling direction, comprising:
   a leading mower mount having first connecting means for connecting same to the pulling vehicle for movement both laterally and perpendicularly with respect to the pulling direction;
   two trailing mower mounts each including second connecting means for connecting same to the leading mower mount for movement both laterally and perpendicularly with respect to the pulling direction and independent of the movement of the other mounts; and
   mounting means disposed on each mower mount for mounting a push-type reel mower thereon between the reel axis and the ground roller axis and below the height of the wheel axis thereof to exert a downwardly slanted force in the pulling direction in response to the application of the pulling force.

2. The assembly according to claim 1 further comprising spring means connected between the mounting means and the mower units for exerting a force counter to the torque generated in response to the application of the pulling force.

3. The assembly according to claim 1 wherein the mounting means comprises a yoke having two arms extending parallel to the pulling direction and two arms extending downwardly and slanted in the pulling direction for connection to the lug holes of the push-type reel mower.

4. The assembly according to claim 1, wherein the second connecting means comprises oversized holes in the leading and trailing mower mounts and shoulder bolts therefor.

* * * * *